June 26, 1956     D. R. SWINGLE     2,752,062
CARRYING CASE
Filed July 9, 1954     3 Sheets-Sheet 1
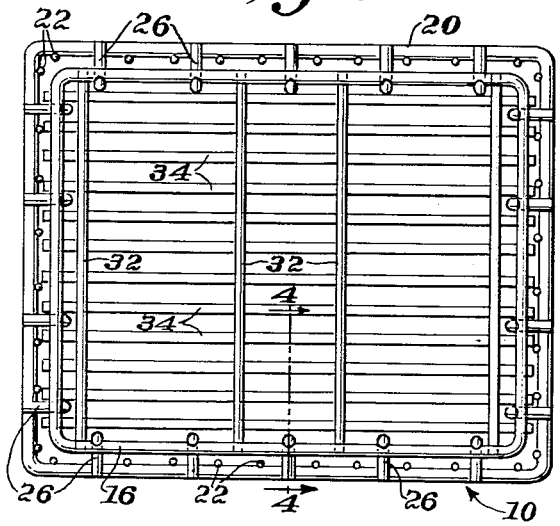
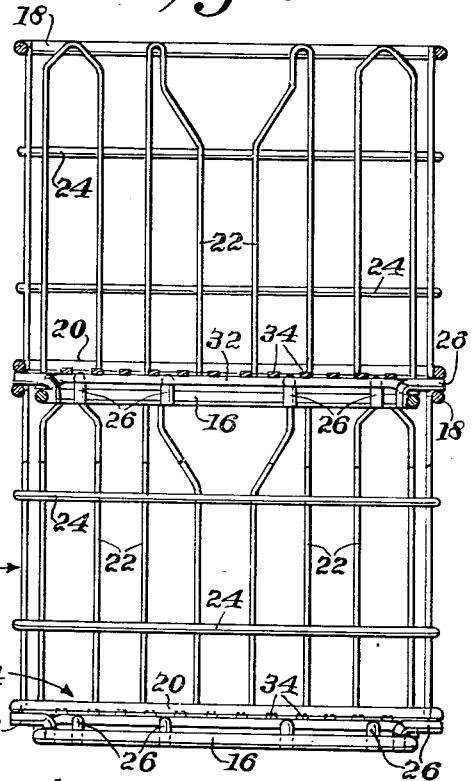
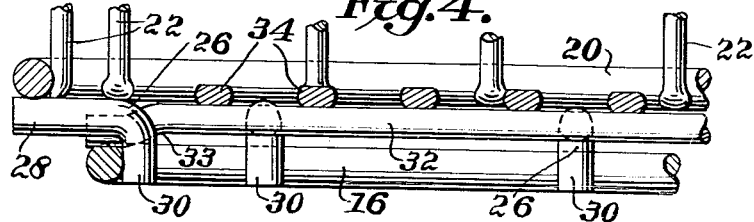
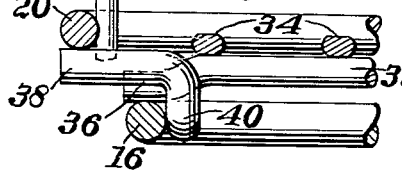
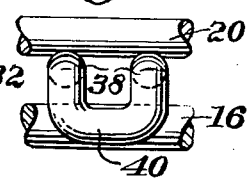
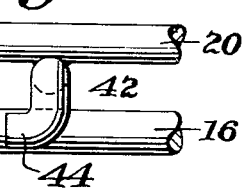
INVENTOR:
Donald R. Swingle,
BY Cushman, Darby & Cushman
ATTORNEYS.

June 26, 1956 D. R. SWINGLE 2,752,062
CARRYING CASE
Filed July 9, 1954 3 Sheets-Sheet 2
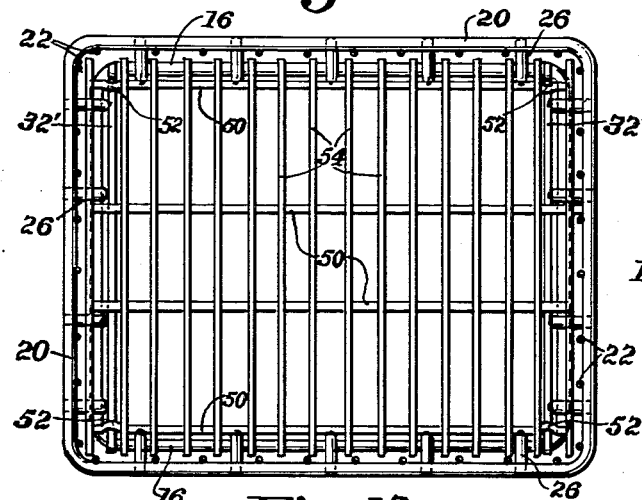
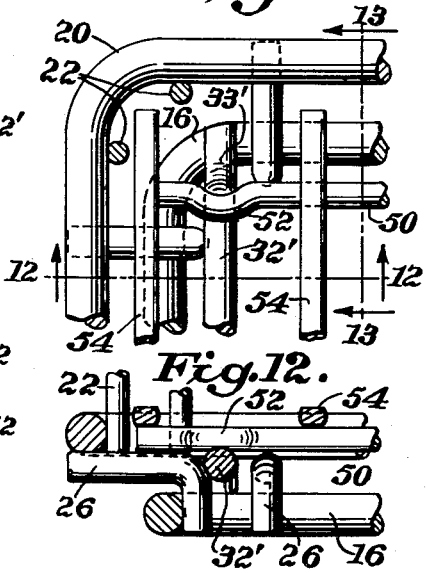
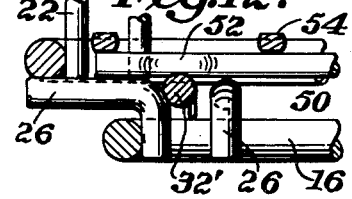
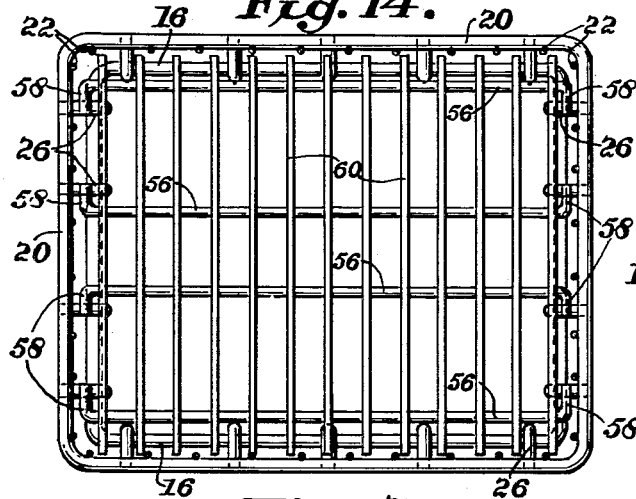
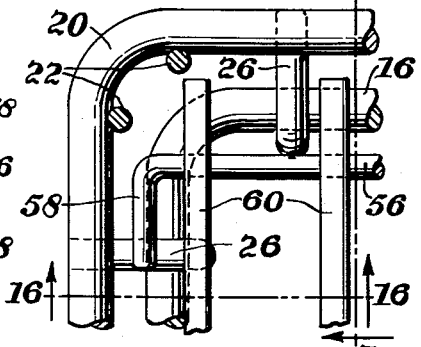
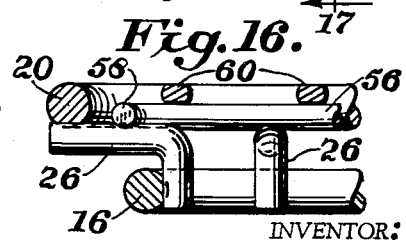
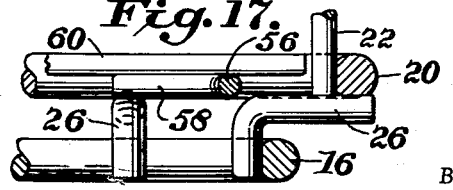
INVENTOR:
Donald R. Swingle,
BY Cushman, Darby & Cushman
ATTORNEYS

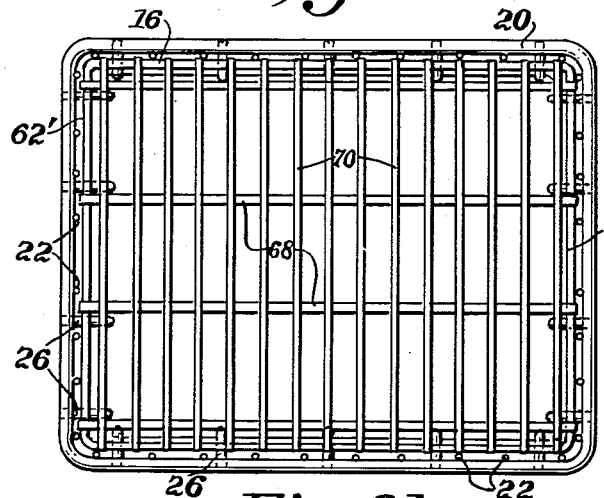
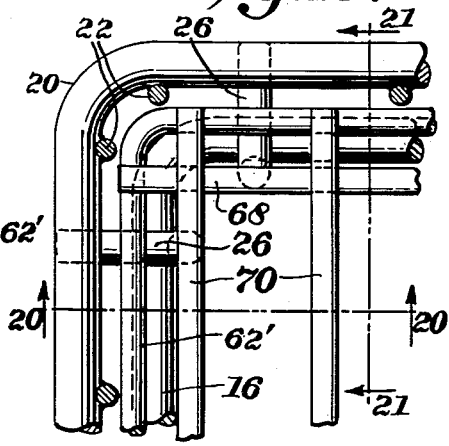
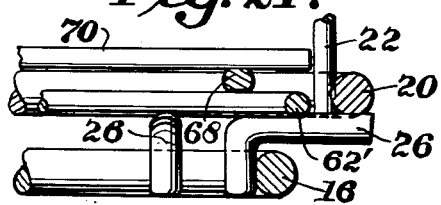
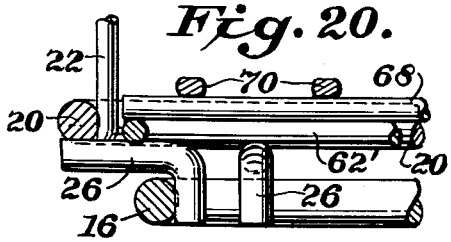
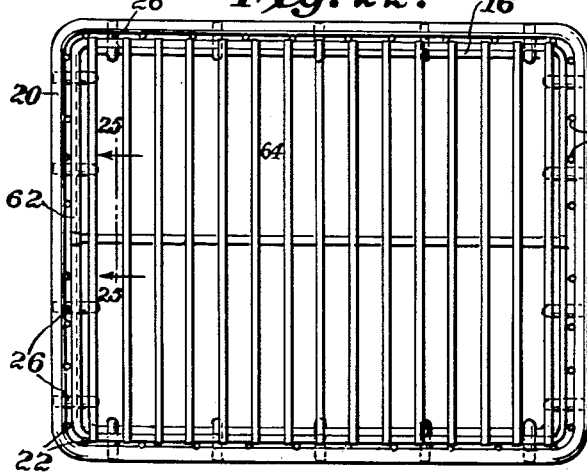
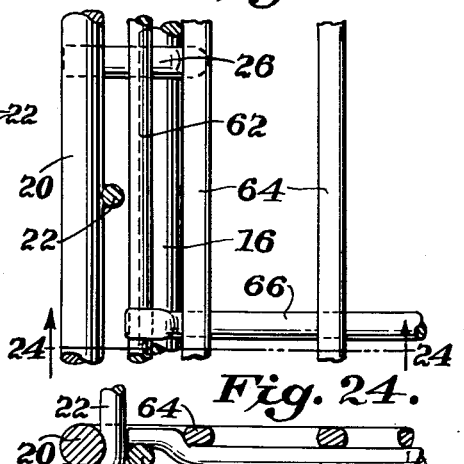
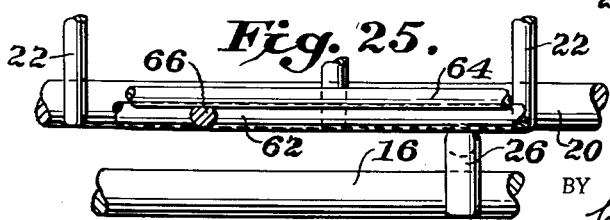
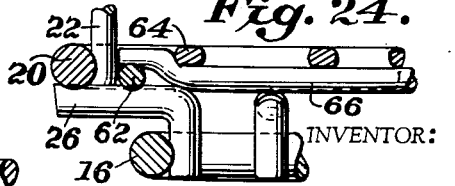

United States Patent Office 2,752,062
Patented June 26, 1956

2,752,062

CARRYING CASE

Donald R. Swingle, Chattanooga, Tenn., assignor to Cumberland Case Company, Chattanooga, Tenn., a corporation of Tennessee Application July 9, 1954, Serial No. 442,269

15 Claims. (Cl. 220—19)

My invention relates to carrying cases and more particularly to an improved case constructed of metal wires for carrying milk cartons and the like.

The object of my invention is to provide an open wire carrying case particularly adapted for carrying milk cartons which includes at its lower surface a depending stacking ring so that a plurality of the cases may be stacked one on top of the other without danger of substantial lateral displacement between the stacked cases.

It will be readily understood, particularly when carrying cases for milk cartons are transported in a delivery truck, that the starting and stopping of the truck will subject the cases to severe forces tending to move the cases laterally with respect to each other and out of their normal stacked relationship. Thus, it is usual to provide the carrying case with a stacking ring to minimize the danger of substantial relative lateral displacement between the carrying cases. Due to the severe forces incident to transportation tending to upset, it is highly advantageous to provide the carrying cases with a stacking ring of substantial depth. However, it will be further appreciated that where the carrying cases are constructed of metal the limitations regarding the overall weight of the carrying cases restrict the depth of the stacking ring which may be provided.

Consequently, an object of my invention is the provision of an open wire carrying case for milk cartons and the like which provides a maximum stacking ring space or depth with a minimum overall weight so as to substantially overcome the difficulties mentioned above.

Another object of my invention is the provision of a carrying case having improved means for supporting articles therein which provides an effective cushioning action for the articles, such as milk cartons and the like, carried thereby.

A further object of my invention is the provision of a carrying case of simple but sturdy construction which may be easily produced.

These and other objects of my invention will become more apparent during the course of the following description and appended claims.

The invention may best be understood with reference to the accompanying drawings wherein illustrative embodiments of my invention are shown.

In the drawings:

Figure 1 is a bottom view of one embodiment of a carrying case constructed in accordance with the present invention;

Figure 2 is a side elevational view partly in section showing two carrying cases in stacked relation;

Figure 3 is a partial perspective view showing certain details of construction of the carrying case;

Figure 4 is a partial cross-sectional view taken along the line 4—4 of Figure 1;

Figure 5 is a fragmentary cross-sectional view showing a modified form of the stacking ring securing means of the present invention;

Figure 6 is a fragmentary side elevation of the structure shown in Figure 5;

Figure 7 is a view similar to Figure 6 illustrating another modification of the stacking ring securing means;

Figure 8 is a view similar to Figure 5 illustrating still another modification of the stacking ring securing means;

Figure 9 is a fragmentary side elevation of the structure shown in Figure 8;

Figure 10 is a sectional plan view showing a modified form of the article supporting structure of the present invention;

Figure 11 is an enlarged fragmentary view of the structure shown in Figure 10;

Figure 12 is a cross-sectional view taken along the line 12—12 of Figure 11;

Figure 13 is a cross-sectional view taken along the line 13—13 of Figure 11;

Figure 14 is a view similar to Figure 10 showing another modified form of the article supporting structure;

Figure 15 is an enlarged fragmentary view of the structure shown in Figure 14;

Figure 16 is a cross-sectional view taken along the line 16—16 of Figure 15;

Figure 17 is a cross-sectional view taken along the line 17—17 of Figure 15;

Figure 18 is a view similar to Figure 10 showing still another modification of the article supporting structure;

Figure 19 is an enlarged fragmentary view of the structure shown in Figure 18;

Figure 20 is a cross-sectional view taken along the line 20—20 of Figure 19;

Figure 21 is a cross-sectional view taken along the line 21—21 of Figure 19;

Figure 22 is a view similar to Figure 10 showing a still further modification of the article supporting structure;

Figure 23 is an enlarged fragmentary view of the structure shown in Figure 22;

Figure 24 is a cross-sectional view taken on the line 24—24 of Figure 23, and

Figure 25 is a cross-sectional view taken on the line 25—25 of Figure 22.

Referring now more particularly to Figures 1–4, I have provided an open wire carrying case generally designated 10 which in its broad aspects includes vertically disposed side walls 12, a bottom wall or article supporting floor 14 and a stacking ring 16 disposed beneath the bottom floor. While this general arrangement is well known in the art, my invention relates to a novel construction whereby the stacking ring 16 is rigidly secured to the side walls in a manner which provides for maximum stacking space and strength with a minimum overall weight.

The side walls 12 are of somewhat conventional construction and include a top perimeter frame wire 18 and a bottom perimeter frame wire 20. The top and bottom perimeter frame wires are preferably rectangular in plan and of substantially the same shape having corresponding transverse dimensions substantially equal. As shown in the drawings, the perimeter frame wires are circular in cross section, however, it will be readily understood that other cross-sectional configurations may be utilized.

The top and bottom perimeter frame wires are disposed in vertically spaced alignment preferably by a series of spaced hair pin wires 22 secured at their upper ends to the top perimeter frame wire 18 and at their bottom ends to the bottom perimeter frame wire 20. The wires 22 are preferably secured to the inner surface of the perimeter frame wires, as by welding or the like, so that the perimeter frame wires will be disposed on the outer side thereof to thereby protect the relatively smaller vertical wires 22. In order to provide the side walls with additional strength, vertically spaced wire rings 24 may be secured, as by welding or the like, to the outer surface of the wires 22.

As is clearly illustrated in Figure 2, the hair pin wires 22 adjacent the mid portion of the sides of the top perimeter frame wire 18 are displaced outwardly so as to provide handle portions on the top perimeter frame wire 18. If desired, the top perimeter frame wire 18 may be depressed at the handle portions for the purpose of minimizing the soiling of the handles from any undesirable material on the bottom of another case when stacked thereon.

As was stated above, my invention provides a strong and rigid stacking ring for a carrying case which secures maximum stacking space with a minimum overall weight. To this end, a plurality of L-shaped rods 26 are provided between the bottom perimeter frame wire 20 and the stacking ring 16 along each side thereof. Each of the L-shaped rods 26 includes a horizontal leg 28 which is secured, as by welding or the like, to the undersurface of the bottom perimeter frame wire 20. Each of the L-shaped rods 26 also includes a vertical leg 30 which extends downwardly from the inner end of the horizontal leg 28. As shown in Figures 1–4, the inner surface of the stacking ring 16 may be secured, as by welding or the like, to the outside surface of the lower end of the vertical legs 30. Thus, the L-shaped rods 26 rigidly secure the stacking ring 16 in vertically spaced relation from the bottom stacking surface of the carrying case.

The bottom wall or article supporting floor 14 is preferably mounted solely on the stacking ring 16 and includes a plurality of spaced horizontal wires 32 which are secured at their ends, as by welding or the like, to the upper surface of the stacking ring 16 at opposite sides thereof. The wires 32 constitute a base for supporting the milk cartons or other articles placed in the carrying case.

Mounted on the upper surface of the horizontal wires 32 are a plurality of spaced wires 34. The wires 34 are disposed transversely of the wires 32 and may be secured thereto, as by welding or the like. As shown in Figures 1–4, the ends of the wires 34 extend outwardly from the outer surface of the stacking ring 16 and in order to prevent the free ends of the wires 34 from being bent or displaced upwardly during use, the base wires 32 are preferably depressed adjacent their ends, as at 33, so as to dispose the free ends of the wires 34 in the plane of the bottom perimeter frame wire 20 and inwardly thereof. In this manner, the bottom perimeter frame wire 20 affords ample protection for the free ends of the wires 34.

It is to be understood that the ends of the wires may be suitably secured to the bottom perimeter frame wire, however, it is preferred to leave the ends free, as shown, since with this construction, the floor possesses marked resilience which greatly aids in cushioning and absorbing the severe shocks to which the milk cartons are subjected during transportation. Moreover, the depressed ends of the base rods 32 afford means to elevate the plane formed by the upper surface of the wires 34 relative to the plane of the upper surface of the horizontal legs 28. This provides ample clearance between the L-shaped rods and the bottoms of milk cartons or other articles placed in the case, even though the article supporting floor is somewhat depressed.

In Figures 5 and 6 I have shown a modified form of the means for securing the stacking ring 16 in vertically spaced relation to the bottom perimeter frame wire 20. In this embodiment, a plurality of spaced rods 36 are utilized in lieu of the rods 26 previously described. The rods 36 are L-shaped in elevation similar to the rods 26, but are composed of a U-shaped rod bent at right angles along its length. Thus, rods 36 include parallel horizontal legs 38 and a U-shaped vertical leg 40. The horizontal legs 38 are secured to the undersurface of the bottom perimeter frame wire 20 in a manner similar to the horizontal leg 28, previously described. The U-shaped vertical legs 40 provide a greater area of contact with the inner surface of the stacking ring 16 and may be securely fixed thereto, as by welding or the like.

In Figure 7 I have shown another modified form of the means for securing the stacking ring in vertical spaced relationship to the perimeter frame wire. In this embodiment, securing rods 42, similar to the securing rods 26 and 36 previously described, are provided. Rods 42 include L-shaped vertical legs 44 which provide a greater contact area with the stacking ring. Rods 42 may be secured, as by welding or the like, to the inner surface of the stacking ring 16 and the undersurface of the top perimeter frame wire in the manner previously described.

In Figures 8 and 9 I have shown still another embodiment of the means for securing the stacking ring in vertically spaced relationship to the bottom perimeter frame wire 20. In this embodiment rods 46 are provided which have relatively short vertical legs 48 which are suitably secured, as by welding or the like, to the upper surface of the stacking ring 16.

In Figures 10–13 I have shown a modified form of the bottom wall or article supporting floor which includes a pair of spaced wires 32' disposed on opposite sides of the case, similar to wires 32 described above. Each of the wires 32' has its opposite end portions depressed, as at 33', and secured respectively to opposite sides of the stacking ring 16. A plurality of spaced cross wires 50 extend transversely of the wires 32' and are secured to the upper surface thereof. The outer cross wires 50 are preferably bent horizontally inwardly as at 52, adjacent their point of connection with the wires 32' for a purpose hereinafter to be described. Mounted on the upper surface of the cross wires 50 are a plurality of closely spaced bottom wires 54 similar to the wires 34 described above. It is to be noted that the upper surface of the cross wires 50 are spaced above the upper surface of the horizontal legs of the L-shaped rods so that the outer bottom wires may be disposed close to the bottom perimeter frame wire above the L-shaped rods, as can be clearly seen in Figures 11 and 12. This arrangement assures that milk cartons placed in the case adjacent the end walls will receive adequate support. Moreover, it will be noted that the modified construction is effectively suspended from the four corners of the case, by the pair of wires 32', so as to provide a flexible supporting surface. This flexibility is highly advantageous where milk cartons are being transported in the cases because of the cushioning action afforded which tends to absorb many of the shocks incident thereto. In this regard, the outer cross wires 50 are preferably disposed just above the bend in the adjacent L-shaped rods so that they will abut the same when sufficiently depressed so as to provide a positive stop therefor. The bends 52 are provided in the outer cross wires so that they will be disposed in this relationship but it is to be understood that other means may be provided. The free ends of the bottom wires may thus extend close to the bottom perimeter wire with no danger that depression of the flexible bottom wall will cause the same to extend below the upper surface of the L-shaped rods. The bottom wall construction therefore provides support completely across the case from side to side and end to end but yet achieves a desirable flexibility which is maintained within an optimum limit.

In Figures 14–17 I have shown still another embodiment of the bottom wall construction. In this embodiment, the article supporting structure includes a plurality of spaced wires 56 bent into generally a U-shaped configuration to provide lateral end portions 58. The opposite end portions 58 of each wire are preferably secured respectively to the upper surface of opposed L-shaped rods adjacent the ends of the case. Mounted on the upper surface of each of the wires 56 are a plurality of closely spaced bottom wires 60, similar to wires 54.

The outer wires 56 are disposed with respect to the L-shaped rods of the adjacent side in a manner similar to that described in connection with the outer wires 50 of the embodiment shown in Figures 10–13 so that there is provided a support which has a desirable flexibility effectively maintained within an optimum limit. It is also to be noted in regard to this embodiment that a considerable weight reduction is achieved and by mounting the wires 56 on the horizontal legs of the L-shaped rods rather than on the stacking ring itself, as with the embodiments previously described, the vertical legs may be lengthened to provide more stacking space without a corresponding lowering of the bottom wall.

In Figures 22–25 I have shown a still further modified form of the article supporting floor which includes a perimeter wire 62 secured to the upper surface of each horizontal leg of the L-shaped rods and spaced inwardly of the bottom perimeter frame wire 20. Mounted across opposite sides of the perimeter wires 62 are a plurality of closely spaced bottom wires 64. A suitable central brace wire 66 may extend between the ends of the perimeter wires 62 to give added support to the bottom wires, if desired. The bottom wires have their ends secured to the upper surface of the perimeter wire 62 so that they are disposed adjacent the bottom perimeter frame wire 20 and do not substantially extend past the perimeter wire 62. With this construction, there is provided an article supporting floor which extends completely across the bottom of the case from side to side and end to end. It will be noted that the stacking ring 16, bottom perimeter frame wire 20 and perimeter wire 62 connected by means of the spaced L-shaped rods 26 form a triangular fabricated truss which form an exceptionally strong case construction.

In Figures 18–21 I have shown still another modified form of the article supporting floor. In this embodiment a perimeter wire 62' is provided similar to the wire 62 of the embodiment shown in Figures 22–25 so that the strong triangular truss construction is obtained. However, instead of securing the bottom wires directly to the perimeter wire a plurality of spaced cross wires 68 extend across opposite ends of the perimeter wire 62'. The opposite ends of the cross wires 68 are preferably secured to the upper surface of the perimeter wire as shown in Figures 20 and 21. Mounted on the upper surface of the cross wires are a plurality of closely spaced bottom wires 70 having their free ends extending over the upper surface of the sides of the perimeter wire 62'. With this construction, the strength of the triangular truss structure is obtained and a desirable flexibility of the bottom wall is also secured. Thus, it will be noted that the bottom wires 70 and cross wires 68 will provide a desirable amount of resilience which is limited by engagement of the free ends of the bottom wires with the sides of the perimeter wire 62'.

I am aware that the provision of an open wire metal carrying case of the general type described is well known in the art. I am also aware of the disclosure of R. H. Bruce in United States Patent No. 2,512,517, issued June 20, 1950, relating to open wire milk carton carrying cases of the type described. However, my invention provides many distinct advantages over the structure disclosed by Bruce.

In my invention the stacking ring 16 is rigidly secured to the bottom perimeter frame wire throughout the entire periphery thereof by means of spaced rods having horizontal and vertical legs. When the cases, according to my invention, are placed in stacked relation, the bottom surface of the horizontal legs are adapted to engage the upper surface of the top perimeter frame wire of a similar case to provide support throughout the entire periphery thereof. In this regard, it is to be noted that the horizontal legs extend transversely of the frame wire so as to provide adquate engagement in the event of a slight relative lateral displacement. In addition, the vertical legs secure the stacking ring 16 in vertically spaced relationship from the supporting surfaces provided by the bottom surface of the horizontal legs. Thus, when the case is placed in stacked relation upon a similar case, the stacking ring 16 is disposed within the top perimeter frame wire of a similar case and, as can be clearly seen in Figure 2, extends slightly therebelow to provide a stacking space of substantial depth.

It will be noted that where the cross-sectional configuration of the stacking ring is circular, the effective stacking spaced is limited to the radius of the cross section unless, in accordance with the principles of my invention, the upper surface of the stacking ring is vertically spaced from the bottom stacking surfaces. Thus, a greater stacking space is provided by the vertical legs of the present construction and in cooperation with the entire peripheral stacking support provided by the horizontal legs, a sturdy carrying case is provided which is of minimum overall weight but is capable of maintaining the cases in stacked relationship while they are being subjected to the severe shocks incident to transportation.

While stacking rings of circular cross section have been found to be the most satisfactory in service, it will be apparent that stacking rings of other cross-sectional configurations may be utilized and that the advantages of the present invention are achieved therewith.

While the embodiments shown in Figures 10–25 are shown as being utilized with L-shaped rods of the type illustrated in Figures 1–4, it will be understood that the L-shaped rods shown in Figures 5–9 may be utilized if desired.

It is to be understood, however, that the form of the invention herewith shown and described is to be taken as the preferred embodiment of the same and that various changes may be made without departing from the spirit of the invention or the scope of the appended claims.

I claim:

1. A carrying case comprising vertical side walls including top and bottom perimeter frame wires of substantially equal corresponding transverse dimensions, a stacking ring disposed below said bottom perimeter frame wire, the transverse dimensions of said stacking ring being less than the corresponding transverse dimensions of said top perimeter frame wire, said case being adapted to be stacked upon a like case with said stacking ring disposed within the top perimeter frame wire of said like case whereby said stacking ring will prevent said case from being transversely displaced from its stacked position, a plurality of short rods extending between said bottom perimeter frame wire and said stacking ring along each side thereof for securing said stacking ring to said bottom perimeter frame wire, each of said rods having an outer end secured to the undersurface of said bottom perimeter frame wire and an inner end forming a vertical leg having its lower end secured to said stacking ring, the undersurface of said rods below said bottom perimeter frame wire being arranged to engage the top perimeter frame wire of a like case so as to support said case in stacked relation thereon, and horizontally extending means disposed in the bottom of said case for supporting articles placed therein.

2. A carrying case as defined in claim 1 wherein the ends of said vertical legs are secured to the upper surface of said stacking ring.

3. A carrying case as defined in claim 1 wherein the ends of said vertical legs are secured to the inner surface of said stacking ring.

4. A carrying case as defined in claim 1 wherein said vertical legs are U-shaped.

5. A carrying case as defined in claim 1 wherein said vertical legs are L-shaped.

6. A carrying case comprising side walls including top and bottom perimeter frame wires of substantially equal corresponding transverse dimensions, a stacking ring disposed below said bottom perimeter frame wire, the transverse dimensions of said stacking ring being less than the corresponding transverse dimensions of said top perimeter frame wire, a plurality of spaced L-shaped rods extending between said stacking ring and said bottom perimeter frame wire along each side wall, each of said rods including a horizontal leg secured to said bottom perimeter frame wire and extending inwardly thereof, said case being adapted to be stacked upon a like case with the lower surface of said horizontal legs engaging the upper surface of the top perimeter frame wire of said like case and with said stacking ring disposed therein so as to prevent said case from being transversely displaced from its stacked position, each of said rods further including a vertical leg secured to said stacking ring so as to vertically space the upper surface of said stacking ring from said lower surface of said horizontal legs, and article supporting means disposed within the bottom portion of said case.

7. A carrying case as defined in claim 6 wherein said article supporting means includes spaced wires having depressed opposite ends secured respectively to opposite sides of said stacking ring.

8. A carrying case as defined in claim 7 wherein said article supporting means includes spaced cross wires secured to said first mentioned spaced wires, the outer cross wires being disposed above the vertical legs of the L-shaped rods on the side adjacent thereto.

9. A carrying case as defined in claim 7 wherein said article supporting means includes spaced generally U-shaped wires having their opposite ends secured respectively to the L-shaped rods on opposite sides of the case.

10. A carrying case as defined in claim 7 wherein said article supporting means includes a perimeter wire secured to said L-shaped rods inwardly of said bottom perimeter frame wire.

11. A carrying case comprising: top and bottom perimeter frame wires of substantially the same rectangular shape in plan; a plurality of spaced vertical wires securing said perimeter frame wires in substantially vertically spaced alignment; a plurality of rods spaced along opposite sides of said bottom perimeter frame wire, each of said rods having an outer end secured to the undersurface of said bottom perimeter frame wire, a horizontal portion extending inwardly from said bottom perimeter frame wire, and a vertical portion extending downwardly from said horizontal portion; a stacking ring secured to the vertical portion of said rods below said bottom perimeter frame wire a distance sufficient to space the upper surface of said stacking ring below the undersurface of the horizontal portion of said rods, said stacking ring having a rectangular shape in plan similar to said perimeter frame wires but of lesser size and being operable upon the stacking of said case upon a like case with the undersurface of the horizontal portion of said rods engaging the upper surface of the top perimeter frame wire of said like case, to enter substantially within the latter and prevent said case from being transversely displaced from its stacked position.

12. A carrying case as defined in claim 11 including a perimeter wire secured to the upper surface of the horizontal portion of said rods, said perimeter wire having a rectangular shape in plan similar to said perimeter frame wires and said stacking ring, but of size greater than the latter and lesser than the former; and means secured to the upper surface of said perimeter wire forming a bottom in said case to support articles placed therein.

13. A carrying case as defined in claim 12 wherein said bottom forming means includes a series of horizontally spaced wires having their opposite ends secured to opposite sides of said perimeter wire, and a support wire extending transversely of said series of horizontally spaced wires and being secured to the undersurfaces thereof and to said perimeter wire.

14. A carrying case comprising vertical side walls including top and bottom perimeter frame wires of substantially equal corresponding transverse dimensions, a stacking ring disposed below said bottom perimeter frame wire, the transverse dimensions of said stacking ring being less than the corresponding transverse dimensions of said top perimeter frame wire, said case being adapted to be stacked upon a like case with said stacking ring disposed within the top perimeter frame wire of said like case whereby said stacking ring will prevent said case from being transversely displaced from its stacked position, a plurality of short rods extending between said bottom perimeter frame wire and said stacking ring along each of the four sides thereof for securing said stacking ring to said bottom perimeter frame wire, each of said rods having its outer end secured to the under surface of said bottom perimeter frame wire and its inner end secured to said stacking ring, the undersurface of said rods below said bottom perimeter frame wire being arranged to engage the top perimeter frame wire of a like case so as to support said case in stacked relation thereon, and horizontally extending means disposed in the bottom of said case for supporting articles placed therein, said horizontally extending means including an inner perimeter wire secured to the upper surface of said short rods intermediate their ends between said bottom perimeter frame wire and said stacking ring.

15. A carrying case comprising vertical side walls including top and bottom perimeter frame wires of substantially equal corresponding tranverse dimensions, stacking means for said case including a stacking ring disposed below said bottom perimeter frame wire, the transverse dimensions of said stacking ring being less than the corresponding transverse dimensions of said top perimeter frame wire so as to enable said case to be stacked upon a like case with said stacking ring disposed within the top perimeter frame wire of said like case whereby said stacking ring will prevent said case from being transversely displaced from its stacked position, said stacking means also including a plurality of short rods extending between said bottom perimeter frame wire and said stacking ring along each of the four sides thereof for securing said stacking ring to said bottom perimeter frame wire, each of said short rods having its outer end secured to the undersurface of said bottom perimeter frame wire and its inner end secured to said stacking ring, the undersurface of said rods below said bottom perimeter frame wire being arranged to engage the top perimeter frame wire of a similar case so as to support said case in stacked relation thereto, a plurality of relatively closely spaced long rods extending horizontally across the bottom of said case for supporting articles placed thereon, and rod means secured to the undersurface of said long rods and to said stacking means adjacent the lower edge of said side walls for mounting substantially all of said long rods out of longitudinal alignment with the short rods disposed on the sides of the case adjacent the ends of said long rods.

References Cited in the file of this patent

UNITED STATES PATENTS

| | | |
|---|---|---|
| 1,161,692 | Klenk | Nov. 23, 1915 |
| 1,291,693 | Behringer | Jan. 14, 1919 |
| 2,512,517 | Bruce | June 20, 1950 |